(12) United States Patent
Reyes, Jr. et al.

(10) Patent No.: US 10,186,334 B2
(45) Date of Patent: *Jan. 22, 2019

(54) INTERNAL DRY CONTAINMENT VESSEL FOR A NUCLEAR REACTOR

(75) Inventors: Jose N. Reyes, Jr., Corvallis, OR (US); John T. Groome, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 1652 days.

This patent is subject to a terminal disclaimer.

(21) Appl. No.: 13/563,527

(22) Filed: Jul. 31, 2012

(65) Prior Publication Data
US 2014/0233688 A1    Aug. 21, 2014

Related U.S. Application Data

(63) Continuation of application No. 11/941,024, filed on Nov. 15, 2007, now Pat. No. 8,687,759.

(51) Int. Cl.
| | |
|---|---|
| *G21C 17/00* | (2006.01) |
| *G21C 13/02* | (2006.01) |
| *G21C 9/012* | (2006.01) |
| *G21C 15/18* | (2006.01) |
| *G21C 1/32* | (2006.01) |
| *G21C 13/024* | (2006.01) |

(52) U.S. Cl.
CPC .......... *G21C 13/022* (2013.01); *G21C 1/322* (2013.01); *G21C 9/012* (2013.01); *G21C 13/024* (2013.01); *G21C 15/18* (2013.01); Y02E 30/40 (2013.01)

(58) Field of Classification Search
CPC .............................. G21C 13/022; G21C 15/18
See application file for complete search history.

(56) References Cited

U.S. PATENT DOCUMENTS

| | | | | |
|---|---|---|---|---|
| 3,276,965 | A | * | 10/1966 | Leyse .......................... 376/210 |
| 3,307,913 | A | | 3/1967 | Chave |
| 3,599,589 | A | | 8/1971 | Busey |
| 3,865,688 | A | | 2/1975 | Kleimola |
| 3,984,282 | A | | 10/1976 | Kleimola |
| 3,986,367 | A | | 10/1976 | Kalpins |

(Continued)

FOREIGN PATENT DOCUMENTS

| | | |
|---|---|---|
| CN | 1038718 | 1/1990 |
| DE | 1564553 | 1/1970 |

(Continued)

OTHER PUBLICATIONS

European Patent Office, "Examination Report", App. No. 12192980.6, dated Dec. 20, 2013, 5 pages.

(Continued)

*Primary Examiner* — Marshall P O'Connor
(74) *Attorney, Agent, or Firm* — Schwabe Williams & Wyatt

(57) ABSTRACT

A power module assembly includes a reactor core immersed in a coolant and a reactor vessel housing the coolant and the reactor core. An internal dry containment vessel submerged in liquid substantially surrounds the reactor vessel in a gaseous environment. During an over-pressurization event the reactor vessel is configured to release the coolant into the containment vessel and remove a decay heat of the reactor core through condensation of the coolant on an inner surface of the containment vessel.

20 Claims, 6 Drawing Sheets

(56) References Cited

U.S. PATENT DOCUMENTS

| | | | |
|---|---|---|---|
| 4,076,585 | A | 2/1978 | Cachera |
| 4,081,323 | A * | 3/1978 | Gans et al. .................. 376/293 |
| 4,302,291 | A | 11/1981 | Severs et al. |
| 4,696,791 | A | 9/1987 | Straub |
| 4,815,697 | A | 3/1989 | Skoda |
| 5,087,408 | A | 2/1992 | Tominaga et al. |
| 5,198,184 | A | 3/1993 | Hiramoto |
| 5,247,553 | A | 9/1993 | Herring |
| 5,267,283 | A | 11/1993 | Berg et al. |
| 5,276,720 | A | 1/1994 | Oosterkamp et al. |
| 5,345,481 | A | 9/1994 | Oosterkamp |
| 5,377,243 | A | 12/1994 | Hill |
| 5,434,894 | A | 7/1995 | Chiang et al. |
| 5,459,768 | A | 10/1995 | Stockhausen |
| 5,570,401 | A | 10/1996 | Gluntz |
| 5,872,825 | A | 2/1999 | Eckardt |
| 6,795,518 | B1 | 9/2004 | Conway et al. |
| 6,885,720 | B2 | 4/2005 | Fennern |
| 8,588,360 | B2 | 11/2013 | Reyes, Jr. et al. |
| 2004/0244841 | A1 | 12/2004 | Modro et al. |
| 2005/0069079 | A1 | 5/2005 | Boardman et al. |
| 2009/0129530 | A1 | 5/2009 | Reyes et al. |
| 2009/0129531 | A1 | 5/2009 | Reyes, Jr. et al. |
| 2009/0161812 | A1 | 6/2009 | Reyes, Jr. et al. |

FOREIGN PATENT DOCUMENTS

| | | |
|---|---|---|
| DE | 19853618 C1 | 6/2000 |
| JP | 64-028592 | 1/1989 |
| JP | 05-055412 | 3/1993 |
| JP | 06-265672 | 9/1994 |
| WO | 2009064654 | 5/2009 |

OTHER PUBLICATIONS

U.S. Appl. No. 13/560,067, filed Jul. 27, 2012, Evacuated Containment Vessel for a Nuclear Reactor.

European Patent Office, "Extended European Search Report", App. No. 12192980.6, dated Apr. 18, 2013, 14 pages.

Reyes et al., "Testing of the Multi-Application Small Light Water Reactor (MASLWR) Passive Safety Systems", Nuclear Engineering and Design, vol. 237, No. 18, Aug. 25, 2007, Amsterdam, The Netherlands, pp. 1999-2005.

Canadian Patent Office, Official Action for App. No. 2705451, dated Jan. 9, 2013, 4 pages.

International Search Report and Written Opinion of International Application No. PCT/US08/82617, dated Jul. 3, 2009.

Hirano, H., et al.; "Experimental study of natural convection heat transfer of air in a cube below atmospheric pressure"; International Journal of Fleet and Mass Transfer; vol. 46, Issue 23, Nov. 2003, pp. 4483-4488.

Modro, S.M., et al.; "Multi-Application Small Light Water Reactor Final Report"; Idaho National Engineering and Environmental Laboratory; Dec. 2003; Idaho Falls, ID, USA.

IAEA; IAEA Tecdoc 1391—Status of Advanced Light Water Reactor Designs 2004; May 2004; pp. 279-306, 489-512; Nuclear Power Technology Development Section, International Atomic Energy Agency; Vienna, Austria.

IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna, Austria.

Reactor, Boiler, & Auxiliaries—Course 233, Containment System, Jul. 1981, pp. 1-18.

Stolowitz Ford Cowger LLP, "Listing of Related Cases", Jul. 31, 2012, 2 pages.

* cited by examiner

PRIOR ART

INTERNAL DRY CONTAINMENT VESSEL FOR A NUCLEAR REACTOR

CROSS-REFERENCE TO RELATED APPLICATION

This application claims priority to, and is a continuation of U.S. patent application Ser. No. 11/941,024, filed on Nov. 15, 2007, the specification of which is herein incorporated by reference in its entirety.

TECHNICAL FIELD

The invention relates to a system for removing decay heat from a nuclear reactor.

BACKGROUND

In the quest to obtain inexpensive and reliable energy, some nuclear reactors have been designed with the goal of being passively operated. In these passive systems, the laws of physics may be employed to ensure that safe operation of the nuclear reactor is maintained during normal operation or even in an emergency condition without operator intervention or supervision, at least for some predefined period of time. One goal of the passive operating systems is to minimize the number of motors, pumps or other electrical or mechanical devices which have traditionally been relied upon to operate the nuclear reactor.

A Multi-Application Small Light Water Reactor project conducted with the assistance of the Idaho National Engineering and Environmental Laboratory, NEXANT and the Nuclear Engineering Department of Oregon State University sought to develop a safe and economical natural light water reactor. Figure illustrates a nuclear reactor design 20 that resulted from this project.

The nuclear reactor design 20 includes a reactor core 6 surrounded by a reactor vessel 2. Water 10 in the reactor vessel 2 surrounds the reactor core 6. The reactor core 6 is further located in a shroud 22 which surround the reactor core 6 about its sides. When the water 10 is heated by the reactor core 6 as a result of fission events, the water 10 is directed from the shroud 22 up into an annulus 23 located above the reactor core 6, and out of a riser 24. This results in further water 10 being drawn into the shroud 22 to be heated in turn by the reactor core 6 which draws yet more water 10 into the shroud 22. The water 10 that emerges from the riser 24 is cooled down and directed towards the outside of the reactor vessel 2 and then returns to the bottom of the reactor vessel 2 through natural circulation. Pressurized steam 11 is produced in the reactor vessel 2 as the water 10 is heated.

A heat exchanger 35 circulates feedwater and steam in a secondary cooling system 30 in order to generate electricity with a turbine 32 and generator 34. The feedwater passes through the heat exchanger 35 and becomes super heated steam. The secondary cooling system 30 includes a condenser 36 and feedwater pump 38. The steam and feedwater in the secondary cooling system 30 are isolated from the water 10 in the reactor vessel 2, such that they are not allowed to mix or come into direct contact with each other.

The reactor vessel 2 is surrounded by a containment vessel 4. The containment vessel 4 is placed in a pool of water 16. The pool of water 16 and the containment vessel 4 are below ground 28 in a reactor bay 26. The containment vessel 4 does not allow any water or steam from the reactor vessel 2 to escape into the pool of water 16 or the surrounding environment. In an emergency situation, steam 11 is vented from the reactor vessel 2 through a steam valve 8 into an upper half 14 of the containment vessel 4, and water 10 flashes as it is released through a submerged blowdown valve 18 which is located in a suppression pool 12. The suppression pool 12 includes sub-cooled water. Over pressurization of the reactor vessel 2 is therefore reduced by releasing both steam 11 through the steam valve 8 and water 10 through the blowdown valve 18 into the containment vessel 4. The rates of release of the steam 11 and water 10 into the containment vessel 4 vary according to the pressure within the reactor vessel 2. Decay heat is removed from the reactor core 6 through a combination of condensation of the steam 11 and energy transfer of the water 10 to the suppression pool water 12.

The water in the suppression pool 12 provides pressure suppression and liquid makeup capabilities in the event of a loss of coolant or pipe rupture in the containment vessel 4. However this also means that electrical and mechanical components in the containment vessel 4 are constantly subject to a corrosive environment, which introduces reliability issues. Insulation that surrounds the reactor vessel 2 loses some of its insulating properties when located in a wet or humid environment, and may need to be replaced at regular intervals. Expensive and exotic materials may be used for the reactor vessel insulation. In addition, maintenance, monitoring and inspection of the electrical and mechanical components must be performed to ensure their continued reliability of operation.

The present invention addresses these and other problems.

SUMMARY OF THE INVENTION

Figure 1:
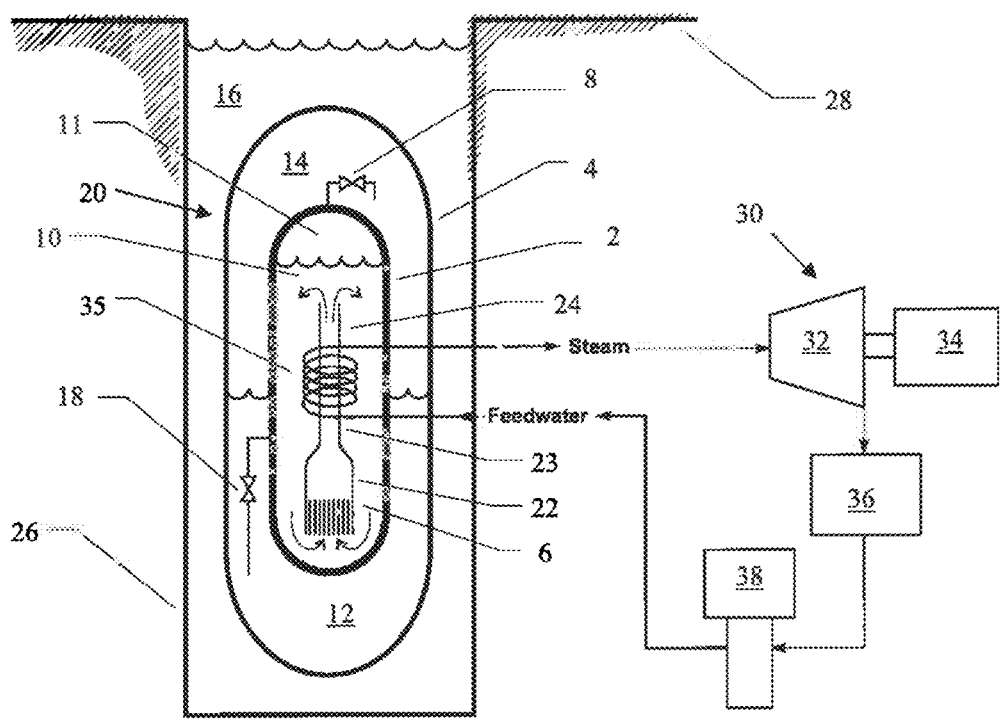
FIG. 1 illustrates a nuclear power system known in the art.

A power module assembly is herein disclosed as including a reactor core immersed in a coolant and a reactor vessel housing the coolant and the reactor core. An internal dry containment vessel is submerged in liquid and substantially surrounds the reactor vessel in a gaseous environment. During an over-pressurization event the reactor vessel is configured to release the coolant into the containment vessel and remove a decay heat of the reactor core through condensation of the coolant on an inner surface of the containment vessel.

A nuclear reactor module is herein disclosed as including a containment vessel designed to prohibit a release of a liquid and a reactor vessel mounted inside the containment vessel, wherein an outer surface of the reactor vessel is exposed to a below atmospheric pressure condition. The nuclear reactor module further includes a reactor core submerged in the liquid and a steam vent connected to the reactor vessel, wherein when the reactor core becomes over-heated the steam vent is configured to vent steam into the containment vessel.

A method of cooling a nuclear reactor is herein disclosed, wherein the method includes scramming the nuclear reactor in the event of a high pressure event indicated in a reactor vessel and releasing coolant into a containment region located between a containment vessel and the reactor vessel. The containment region surrounds the reactor vessel and is substantially dry prior to the high pressure event. The method further includes condensing the coolant on an inner wall of the containment vessel, transferring a decay heat to a liquid medium surrounding the containment vessel, and maintaining the pressure in the containment region within design limits through the condensation of the coolant on the inner wall.

The invention will become more readily apparent from the following detailed description of a preferred embodiment of the invention which proceeds with reference to the accompanying drawings.

DESCRIPTION OF EXAMPLE EMBODIMENTS

Conventional nuclear facilities are expensive to license and build, with significant upfront investment costs and delayed return of profits. In addition to energy cost considerations, efficiency requirements, and reliability concerns, today's nuclear reactor designs must also take into account issues of nuclear proliferation, terrorist activities, and a heightened awareness of environmental stewardship.

Developing countries that could otherwise greatly benefit from nuclear power are frequently left to resort to other energy sources such as coal, gas or hydroelectric power generators that produce significant amounts of pollution or have other detrimental environmental impact. These developing countries may not have the technological or natural resources that enable them to build a nuclear power plant. Countries that have already developed nuclear power may be hesitant to introduce these technologies into the developing countries out of concern of the loss of control of the nuclear materials or technology.

Passively safe nuclear power systems help address some of these concerns. Further system improvements and innovative designs are expected to usher in a new era of nuclear power as a globally viable primary energy source.

Figure 2:
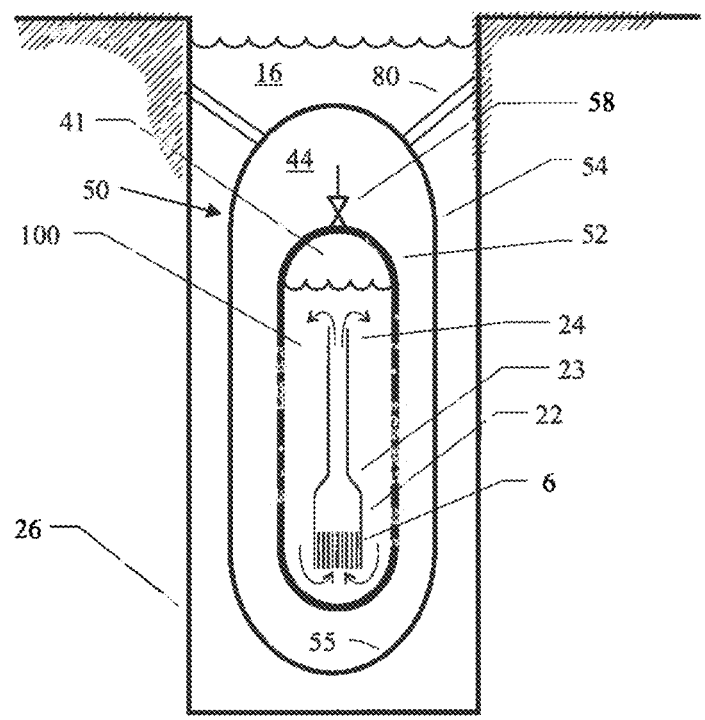
FIG. 2 illustrates a novel power module assembly including an internally dry containment vessel.

FIG. 2 illustrates a novel power module assembly 50 including an internally dry containment vessel 54. The containment vessel 54 is cylindrical in shape, and has spherical upper and lower ends. The entire power module assembly 50 may be submerged in a pool of water 16 which serves as an effective heat sink. The containment vessel 54 may be welded or otherwise sealed to the environment, such that liquids and gas do not escape from, or enter, the power module assembly 50. The containment vessel 54 may be bottom supported, top supported or supported about its center. Supporting the containment vessel 54 at the top may facilitate maintenance and removal of the power module assembly 50 from the pool of water 16.

In one embodiment, the containment vessel 54 is suspended in the pool of water 16 by one or more mounting connections 80. The mounting connections 80 may be attached to the upper portion of the containment vessel 54. The mounting connections 80 may be rigid or flexible members that help locate the containment vessel 54 approximately at the center of the pool of water 16. During seismic activities, such as earthquakes, the pool of water 16 acts as a protective cushion about the containment vessel 54 to avoid damage that may otherwise result if the containment vessel 54 came into contact with the reactor bay 26. Flexible mounting connections such as chains or cables attached to the wall of the reactor bay 26, may reduce an amount of vibration or stress that might otherwise be transferred to the containment vessel 54. In one embodiment, a flexible tie down connector is attached to the bottom of the containment vessel 54 to reduce sway or lateral movement. The power module assembly 50 may be arranged to float in the pool of water 16 to minimize support requirements and provide seismic resistance. A support base may be provided on the bottom of the containment vessel 54 to support the power module assembly 50 in a standing position.

A reactor vessel 52 is located or mounted inside the containment vessel 54. An inner surface of the reactor vessel 52 may be exposed to a wet environment including a coolant 100 or liquid, such as water, and an outer surface may be exposed to a dry environment such as air. The reactor vessel 52 may be made of stainless steel or carbon steel, may include cladding, and may be supported within the containment vessel 54.

The power module assembly 50 may be sized so that it can be transported on a rail car. For example, the containment vessel 54 may be constructed to be approximately 4.3 meters in diameter and 17.7 meters in height (length). By completely sealing the containment vessel 54, access to the reactor core 6 may be restricted. Any unauthorized access or tampering may be monitored. Furthermore, the subterranean profile of a nuclear power system makes it less visible and easier to conceal. The pool of water 16 may be covered with a protective shield (not shown) to further isolate the power module assembly 50 from outside threats or airborne objects such as planes or missiles.

Refueling of the reactor core 6 may be performed by transporting the entire power module assembly 50 by rail car or overseas, for example, and replacing it with a new or refurbished power module assembly which has a fresh supply of fuel rods. Refueling and maintenance activities may be performed by unbolting flanges or cutting the vessels in the cylindrical portion at an elevation above the reactor core 6. Refueling may be accomplished once every 2 to 10 years or even longer, depending on fuel type and system specifications.

The containment vessel 54 encapsulates and, in some conditions, cools the reactor core 6. It is relatively small, has a high strength and may be capable of withstanding six or seven times the pressure of conventional containment designs in part due to its smaller overall dimensions. Given a break in the primary cooling system of the power module assembly 50 no fission products are released into the environment. Decay heat may be removed from the power module assembly 50 under emergency conditions.

The reactor core 6 is illustrated as being submerged or immersed in a primary coolant 100, such as water. The reactor vessel 52 houses the coolant 100 and the reactor core 6. A shroud 22 surrounds the reactor core 6 about its sides and serves to direct the coolant 100 up through an annulus 23 and out a riser 24 located in the upper half of the reactor vessel 52 as a result of natural circulation of the coolant 100. In one embodiment, the reactor vessel 52 is approximately 2.7 meters in diameter and includes an overall height (length) of 13.7 meters. The reactor vessel 52 may include a predominately cylindrical shape with spherical upper and lower ends. The reactor vessel 52 is normally at operating pressure and temperature. The containment vessel 54 is internally dry and may operate at atmospheric pressure with wall temperatures at or near the temperature of the pool of water 16.

The containment vessel 54 substantially surrounds the reactor vessel 52 in a dry or gaseous environment identified as containment region 44. Containment region 44 may be filled with air. The containment vessel 54 includes an inner surface 55 or inner wall which is adjacent to the containment region 44. The containment region 44 may include a gas or gases instead of or in addition to air. In one embodiment, the containment region 44 is maintained at a below atmospheric pressure condition, for example as a partial vacuum. Gas or gasses in the containment vessel may be removed such that the reactor vessel 52 is located in a complete or partial vacuum in the containment region 44.

During normal operation, thermal energy from the fission events the reactor core 6 causes the coolant 100 to heat. As the coolant 100 heats up, it becomes less dense and tends to rise up through the annulus 23 and out of the riser 24. As the coolant 100 cools down, it becomes relatively denser than the heated coolant and is circulated around the outside of the annulus 23, down to the bottom of the reactor vessel 52 and up through the shroud 22 to once again be heated by the reactor core 6. This natural circulation causes the coolant 100 to cycle through the reactor core 6, transferring heat to a secondary coolant system, such as the secondary cooling system 30 of FIG. 1 to generate electricity.

The natural circulation may be enhanced by providing a two phase condition of the coolant 100 in the riser 24. In one embodiment, gas is injected into or near the reactor core 6 to create or augment the two phase condition and increase a flow rate of the coolant 100 through the riser 24. Whereas voiding the reactor core 6 produces a negative insertion of reactivity, a steady-state condition followed by a non-voided condition may result in a positive insertion of reactivity, hi one embodiment, the reactivity is further controlled through a combination of managing control rod insertion rates and temperature sensitive control rod trips.

Figure 3:
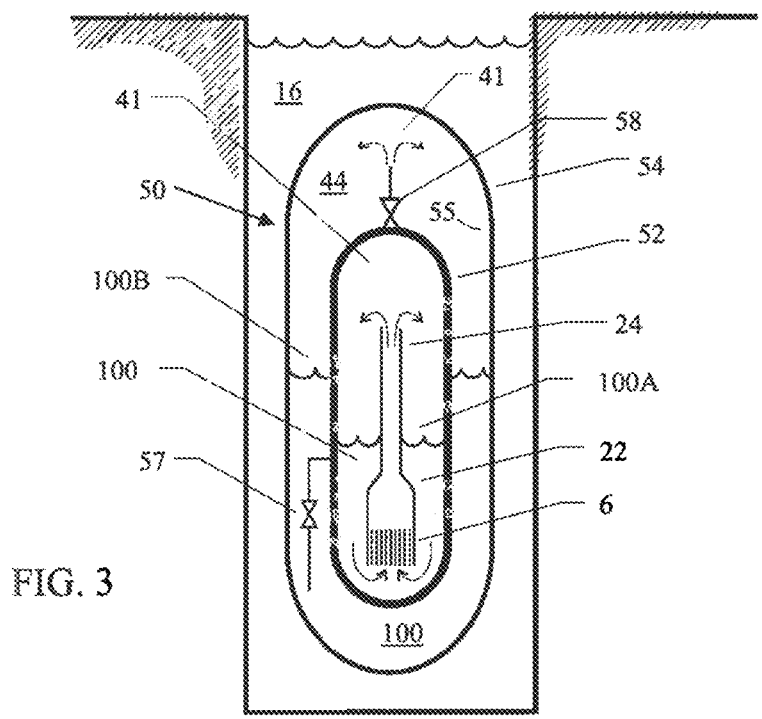
FIG. 3 illustrates the power module assembly of FIG. 2 during an emergency operation.

FIG. 3 illustrates the power module assembly 50 of FIG. 2 during an emergency operation. The emergency operation may include a response to an overheating of the reactor core 6, or an over-pressurization event of the reactor vessel 52, for example. During the emergency operation, the reactor vessel 6 may be configured to release the coolant 100 into the containment region 44 of the otherwise dry containment vessel 54. A decay heat of the reactor core 6 may be removed through condensation of the coolant 100 on the inner surface 55 of the containment vessel 54. Whereas the containment vessel 54 may be immersed in a pool of water 16, the inner surface 55 of the containment vessel 54 may be completely dry prior to the emergency operation or over-pressurization event. For example, the suppression pool 12 of FIG. 1 does not exist in the containment vessel 54 during normal operation.

A flow limiter 58 or steam vent may be mounted on the reactor vessel 52 for venting the coolant 100 into the containment vessel 54 during the emergency operation. The coolant 100 may be released into the containment vessel 54 as a gas or vapor 41, such as steam. The flow limiter 8 may be connected or mounted directly to an outer wall of the reactor vessel 52, without any intervening structures such as piping or connections. In one embodiment, the flow limiter 58 is welded directly to the reactor vessel 52 to minimize the likelihood of any leaking or structural failures. The flow limiter 58 may be a Venturi flow valve sized to release coolant 100 into the containment vessel 54 at a controlled rate. In one embodiment, the coolant 100 is released only in the form of steam or vapor from the reactor vessel 52. The condensation of the vapor 41 may reduce pressure in the containment vessel 54 at approximately the same rate that the vented vapor 41 adds pressure to the containment vessel 54. In one embodiment, the flow limiter 58 is configured to release approximately five megawatts of heat contained in the vapor 41.

Coolant 100 that is released as vapor 41 into the containment vessel 54 condenses on the inner surface 55 of the containment vessel 54 as a liquid, such as water. The condensation of the vapor 41 causes the pressure in the containment vessel 54 to decrease, as the vapor 41 is transformed into the liquid coolant 100. A sufficient amount of heat may be removed from the power module assembly 50 through the condensation of the vapor 41 on the inner surface 55 of the containment vessel to manage the removal of decay heat from the reactor core 6. In one embodiment, there is no release of the liquid coolant 100 from the reactor vessel 52 even during an emergency operation. The condensed coolant 100 descends to the bottom of the containment vessel 54 and collects as a pool of liquid. As more vapor 41 condenses on the inner surface 55, the level of the coolant 100 in the bottom of the containment vessel 54 gradually rises. Heat stored in the vapor 41 is transferred through the walls of the containment vessel 54 into the pool of water 16 that acts as an ultimate heat sink. Heat stored in the coolant 100 located at the bottom of the containment vessel 54 is transferred through liquid convection and conduction heat transfer on the inner surface 55.

Heat removed from the steam or vapor 41 may be transferred to the relatively cold inner surface 55 through condensation on the inside walls of the cold containment vessel 54 and by natural convection from the hot coolant to the inner surface 55. Heat may be transferred to the pool of water 16 by conduction through the containment vessel walls and through natural convection on an outside surface of the containment vessel 54. The coolant 100 remains confined within the power module assembly 50 after the reactor core 6 becomes over-heated and during the emergency operation. The heat transferred to the pool of water 16 may provide adequate passive decay heat removal for three or more days without any operator intervention.

The containment vessel 54 may be designed to withstand the maximum pressure that would result given an instantaneous release of the high-pressure fluid from the reactor vessel 52 into the containment vessel 54. The pressure inside the containment vessel 54 may be designed to equilibrate with the pressure inside the reactor vessel 52, stopping break flow caused by the pressure difference. Over time, the amount of pressure in the containment vessel 54 may be made to equalize with the amount of pressure in the reactor vessel 52, resulting in coolant level 100A in the reactor vessel 52 and coolant level 100B in the containment vessel 54 as shown in FIG. 3. The coolant level 100B is shown elevated with respect to the coolant level 100A due to higher coolant temperatures in the reactor vessel 52 as compared with temperatures in the containment vessel 54. FIG. 3 shows that the coolant levels 100A and 100B may equilibrate such that the coolant level 100A in the reactor vessel 52 remains above the top of the reactor core 6, keeping the reactor core 6 covered with coolant 100 at all times.

A flow valve 57 may be provided to allow the coolant 100 to flow from the containment vessel 54 back into the reactor vessel 52 once a steady state condition of the coolant levels 100A, 100B is achieved. Coolant 100 that is allowed to reenter the reactor vessel 52 through the flow valve 57 replenishes the coolant 100 that was vented as vapor 41 through the flow limiter 58. The flow of coolant 100 through the flow valve 57 may be achieved through the natural circulation of the passive system due to the different water densities that result from temperature differences in the vessels 52, 54. No mechanical or electrical pumps or motors are required. In one embodiment, the flow valve 57 restricts the flow of coolant 100 in a single direction, from the containment vessel 54 to the reactor vessel 52.

When the reactor core 6 becomes over-heated the flow limiter 58 or steam vent is configured to vent the coolant 100, for example as steam or vapor 41, into the containment vessel 54 at a rate that maintains an approximate constant pressure in the containment vessel 54 during a steady state condition. In one embodiment, the containment vessel 54 undergoes an initial pressure spike prior to reaching the steady state condition. By controlling the rate of pressure increase in the containment vessel 54, the thickness of the containment vessel wall can be designed with less material strength on account of the lower, controlled pressures therein. Decreasing the wall thickness can lessen the transportation weight of the power module assembly 50 and decrease manufacturing and delivery costs.

Whereas a complete or perfect vacuum may be commercially or technically impractical to achieve or maintain, a partial vacuum may be created in the containment vessel 54. Any reference to a vacuum herein is therefore understood to be either a partial or complete vacuum. In one embodiment, the containment region 44 is maintained at a vacuum pressure that significantly reduces convective and conductive heat transfer through the containment gases. By substantially removing gases from the containment region 44, for example by maintaining a vacuum within the containment vessel 54, the initial rate of condensation of vapor 41 on the inner surface 55 is increased. Increasing the rate of condensation increases the rate of heat transfer through the containment vessel 54.

A vacuum within the containment region 44 acts as a type of thermal insulation during normal operation, thereby retaining heat and energy in the reactor vessel 52 where it can continue to be utilized. As a result, less material insulation may be used in the design of the reactor vessel 52. In one embodiment, a reflective insulation is used instead of or in addition to conventional thermal insulations. Reflective insulation may be included on one or both of the reactor vessel 52 or the containment vessel 54. The reflective insulation may be more resistant to water damage compared to conventional thermal insulation. In addition, reflective insulation does not impede a transfer of heat from the reactor vessel 52 as much as the conventional thermal insulation during an emergency condition. The combination of a vacuum and reflective insulation therefore provides thermal insulation during normal operation and promotes the transfer of heat away from the reactor core 6 during the emergency condition.

In the event of a loss of the vacuum in the containment region 44, the introduced gases or liquids provide a further passive safety cooling mechanism to transfer heat between the reactor vessel 52 and the containment vessel 54 through natural convection. For example, by reducing or eliminating conventional thermal insulation, a more effective heat transfer from the reactor vessel 52 can be made during the emergency operation due to the condensed liquid coolant 100 which pools at the bottom of the containment vessel 54. Heat is able to be transferred from the reactor vessel 52 through the liquid coolant 100 to the containment vessel 54.

Additionally, the removal of air and other gases from the containment region 44 may reduce or completely eliminate the need for any hydrogen recombiners that are typically used to reduce combustible mixtures of gases that might otherwise develop. During an emergency operation, steam may chemically react with the fuel rods to produce a high level of hydrogen. When hydrogen mixes with air or oxygen, this may create a combustible mixture. By removing a substantial portion of the air or oxygen from the containment vessel 54, the amount of hydrogen and oxygen that is allowed to mix is minimized or eliminated. In one embodiment, any air or other gases that reside in the containment region 44 are removed or voided when an emergency condition is detected.

Figure 4:
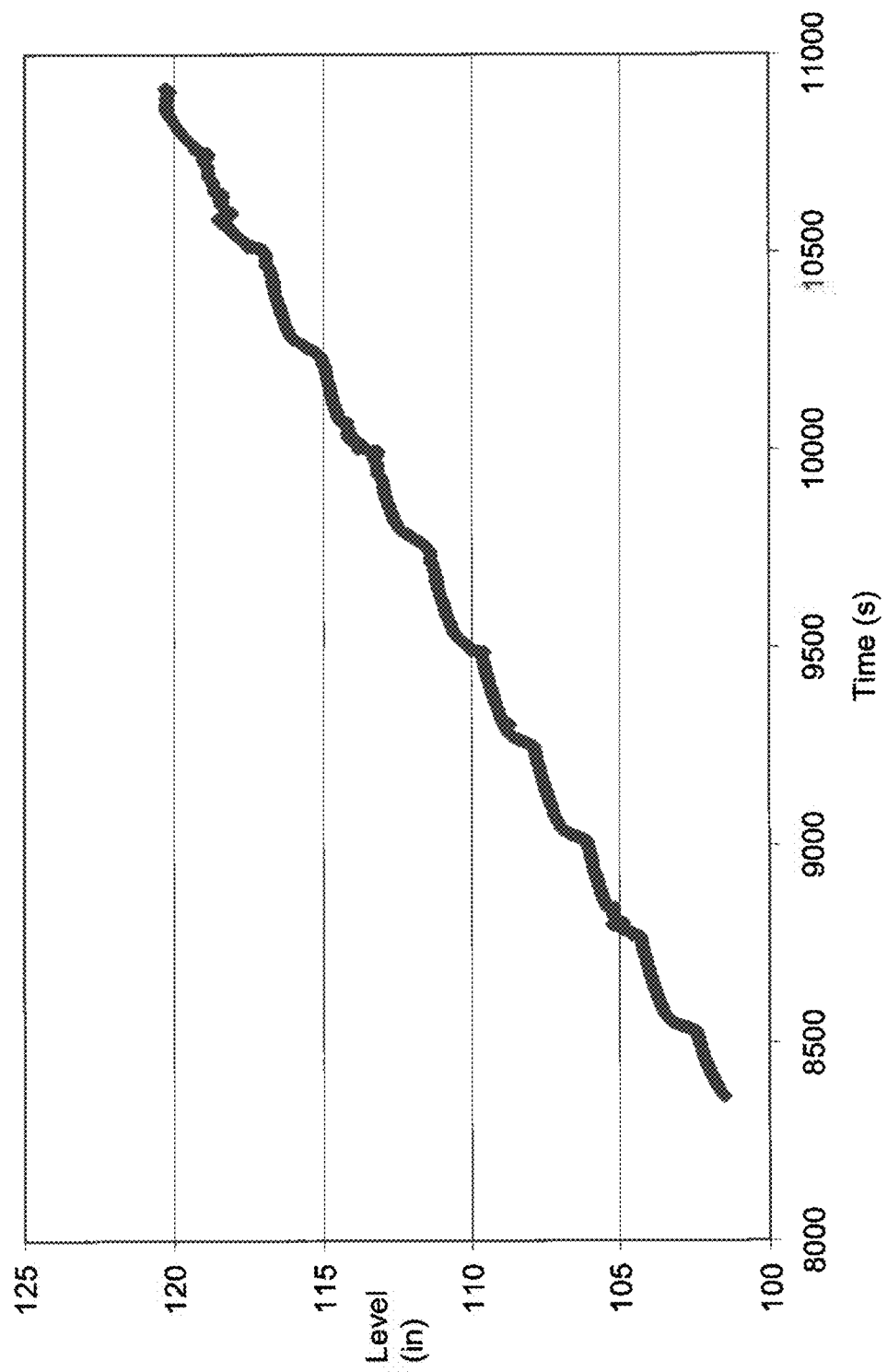
FIG. 4 illustrates an example rate of condensation of released vapor into a containment vessel.

FIG. 4 illustrates an example rate of condensation of released coolant 100 into the containment vessel 54. As previously described, the coolant 100 may be vented as steam or vapor 41 that condenses on the inner surface 55 of the containment vessel 54. The flow limiter 58 controls the rate of release of coolant 100 as vapor 41 into the containment vessel 54, such that the rate of increase of coolant level 100B in the containment vessel 54 may be determined or managed. According to the graph of FIG. 4, approximately 110 inches of coolant 100 may collect at the bottom of the containment vessel 54 after a period of 9500 seconds or about 2 hours and 38 minutes. Of course, this rate of increase in coolant level 100B will depend on the size of the reactor vessel 52 and containment vessel 54 as well as the design of the flow limiter 58.

In one embodiment, the rate of increase of the coolant level 100B flattens out at a near constant value once the pressures in the reactor vessel 52 and containment vessel 54 equalize or reach steady state. A flow of coolant 100 through the flow valve 57 of FIG. 3 into the reactor vessel 52 may remove approximately the same amount of coolant 100 that condenses as liquid on the inner surface 55 of the containment vessel 54.

Figure 5:
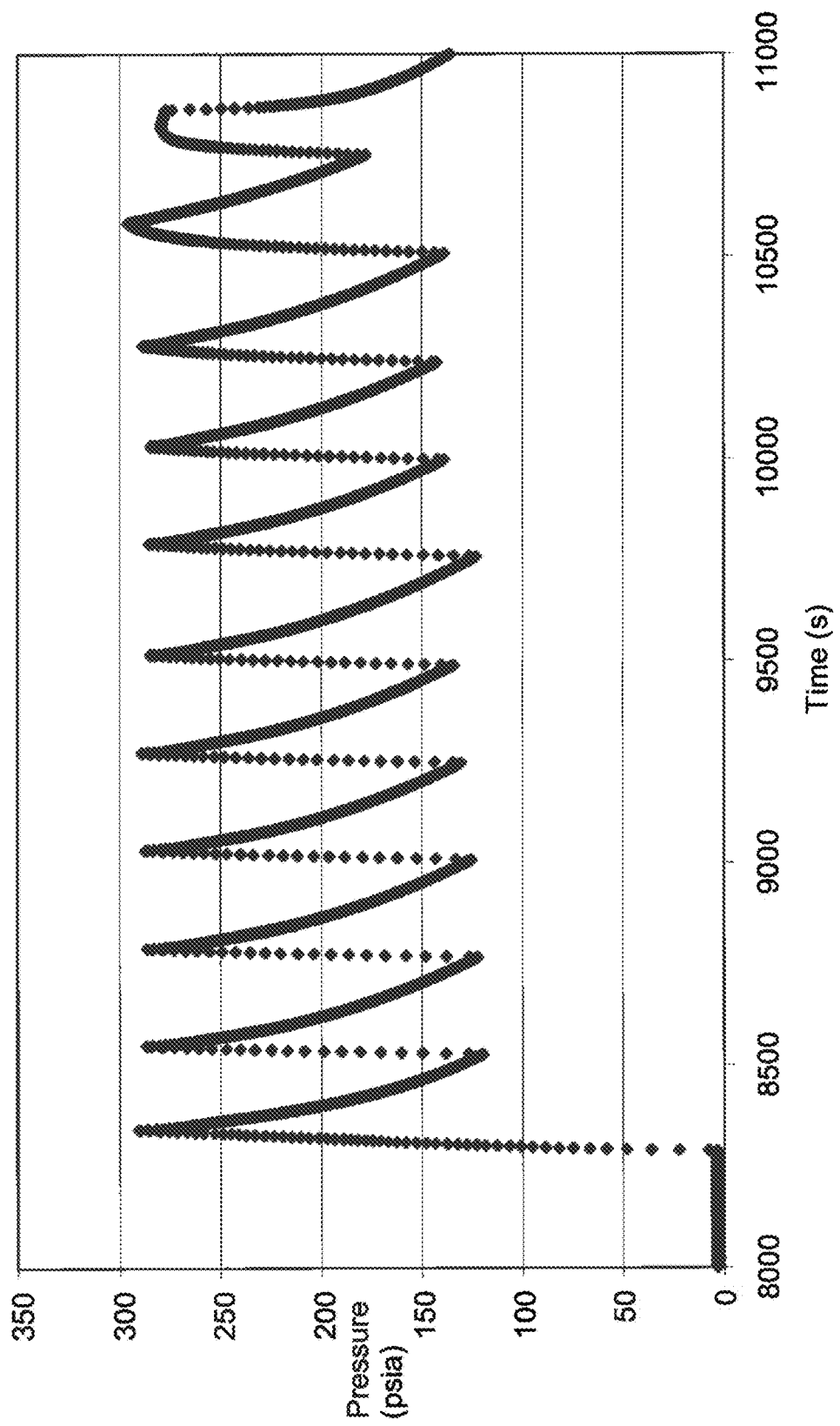
FIG. 5 illustrates an example pressure fluctuation in a containment vessel during an over-pressurization event.

The flow limiter 58 connected to the reactor vessel 52 may vent the vapor 41 at a rate that maintains an approximate constant pressure in the containment vessel 54 during a steady state condition. FIG. 5 illustrates an example pressure fluctuation in the containment vessel 54 during an over-pressurization event. In one embodiment, the pressure inside the containment vessel 54 may be at or near atmospheric pressure prior to the over-pressurization event. In another embodiment, the pressure inside the containment vessel is maintained as a vacuum. The containment vessel 54 may then undergo a pressure spike that increases the pressure up to some predetermined upper threshold value.

In one embodiment, the upper threshold pressure value is approximately 300 psia. Once the pressure reaches the upper threshold value, the flow limiter 58 may close or otherwise prohibit the further release of coolant 100 as vapor 41 into the containment vessel 54. The pressure within the containment vessel 54 then decreases due to the condensation of the vapor 41 into a liquid. The pressure may be allowed to decrease down to some predetermined lower threshold value. In one embodiment, the lower threshold pressure value is less than 150 psia. Once the pressure reaches the lower threshold value, the flow limiter 58 may open or otherwise allow the release of additional coolant 100 into the containment vessel 54. The pressure within the containment vessel 54 then increases until it once again reaches the upper threshold value, continuing the cycle of pressurization and depressurization while the decay heat is being removed from the reactor core 6. The pressure within the containment 54 may therefore be maintained between the upper and lower threshold values.

A steam nozzle flow area of the flow limiter 58 may be calculated according to measurements or estimated values of steam condensation rate in the containment vessel 54, an energy removal rate from the containment vessel 54, and a heat up rate of the pool of water 16 of FIG. 3. A rate of change of liquid level in the containment vessel 54 may be approximately 0.0074 inches per second in one embodiment. According to the principle of conservation of mass, the mass flow rate of steam condensed to liquid may be determined according to the following equation:

$$dM_L/dt = \rho_L A_C (dL/dt)_C = m \quad (1)$$

The heat transfer rate to the inner surface 55 of the containment vessel 54 may be given by the following equation:

$$q = m h_{fg} \quad (2)$$

The heat up rate for the pool of water 16 may be determined using the following equation:

$$MC_P dT/dt = q \quad (3)$$

Assuming that the cooling pool mass, the cooling pool water specific heat at constant pressure, and the heat input are constants, allows one to integrate equation (2) to obtain the time required to heat the pool of water 16 according to the following equation:

$$\Delta t = MC_P \Delta T/q \quad (4)$$

In one embodiment, the upper temperature of the pool of water 16 is set at below boiling, such as 200 degrees Fahrenheit. Finally, the equation for the choke flow of steam may be given by the following equation:

$$m = C_d A [K g_c \rho_g P]^{(1/2)} \quad (5)$$

where $C_d$ is a discharge coefficient of approximately 0.95 and where $$K = \gamma [2/(\gamma+1)]^{(\gamma+1)/(\gamma-1)}.$$

An initial 6% decay heat may be experienced by the primary cooling system during the first 100 seconds of a steam blow-down scenario, however this flattens out to 2% or 3% in the steady state condition. Releasing the pressure into the containment vessel 54 can result in approximately 3% of the decay heat being transferred from the reactor vessel 52, which accommodates the amount of decay heat being released at steady state. This is accomplished through the passive emergency feedwater and decay heat removal system described herein, without the need for a pre-existing source of water or suppression pool being located inside the containment vessel 54.

Figure 6:
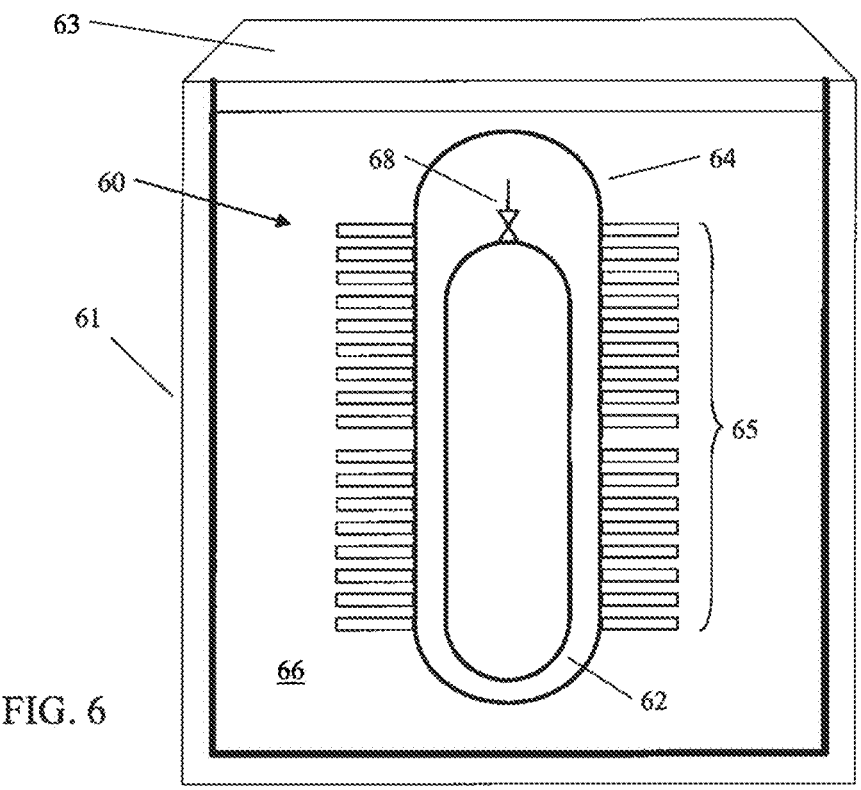
FIG. 6 illustrates an alternate embodiment of a power module assembly including a containment vessel having cooling fins.

FIG. 6 illustrates an alternate embodiment of a power module assembly 60 including a containment vessel 64 having fins 65 to increase a cooling surface area. The cooling fins 65 may be attached to an outside wall of the containment vessel 64 to remove decay heat of a reactor core during an emergency operation. During normal operation of the power module assembly 60, the inside of the containment vessel 64 remains dry, whereas a reactor vessel 62 contains a coolant as well as a reactor core. In one embodiment, the containment vessel 64 is in a depressurized state or vacuum during no normal operating conditions. The coolant may be a liquid or gas. In the emergency operation, such as over-pressurization of the reactor vessel 62, coolant is released out of flow limiter 68 into the containment vessel 64. The coolant circulates within and releases heat into the wall of the containment vessel 64. The heat is then removed from the containment vessel through convection or conduction into a surrounding heat sink 66.

Heat sink 66 may be a fluid such as water or gas. In one embodiment, the heat sink is composed of earth (e.g. rock, soil or other solid material) that completely surrounds the containment vessel 66. Fins 65 may be attached to the containment vessel 64 and provide additional surface area with which to transfer the decay heat to the heat sink 66. The fins 65 may encircle the containment vessel 64. In one embodiment, the fins 65 are orientated in horizontal planes. The heat sink 66 may be contained in a containment structure 61 such as concrete. A cover 63, which may also be made of concrete, may completely enclose the power module assembly 60 and heat sink 66. The containment structure 61 and cover 63 may serve to protect against an impact from foreign projectiles and also operate as a biological shield.

Figure 7:
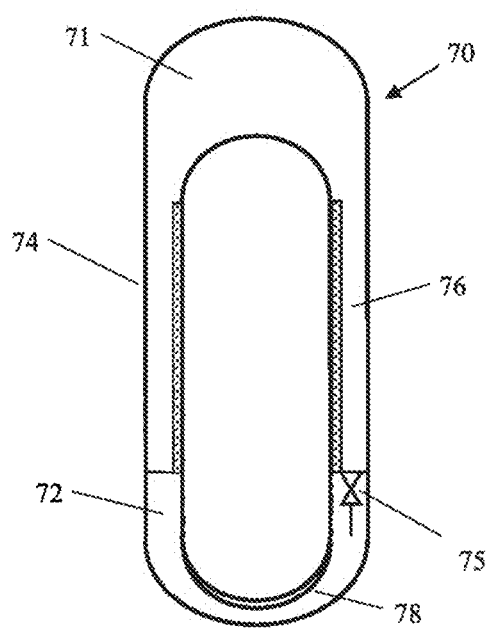
FIG. 7 illustrates an embodiment of a power module assembly including multiple containment regions.

FIG. 7 illustrates an embodiment of a power module assembly 70 including multiple containment regions 71, 72. The containment region may be compartmentalized into a first containment region 71 and a second containment region 72. The first containment region 71 may be located in an upper portion of the containment vessel 74 and the second containment region 72 may be located in a lower portion of the containment vessel 74. The first containment region 71 may be maintained at atmospheric pressure, whereas the second containment region 72 may be maintained at a below atmospheric pressure.

One or more valves 75 may be provided between the first and second containment regions 71, 72. Valve 75 may operate in the event of an emergency condition to release pressure. In one embodiment, valve 75 operates to transfer liquid coolant that condenses in the first containment region 71 such that it collects in the second containment region 72. In one embodiment, conventional thermal insulation 76 is included in the first containment region 71 and reflective insulation 78 is included in the second containment region 72. Any number of containment regions may be provided for, some or all of which may be maintained as a vacuum.

Figure 8:
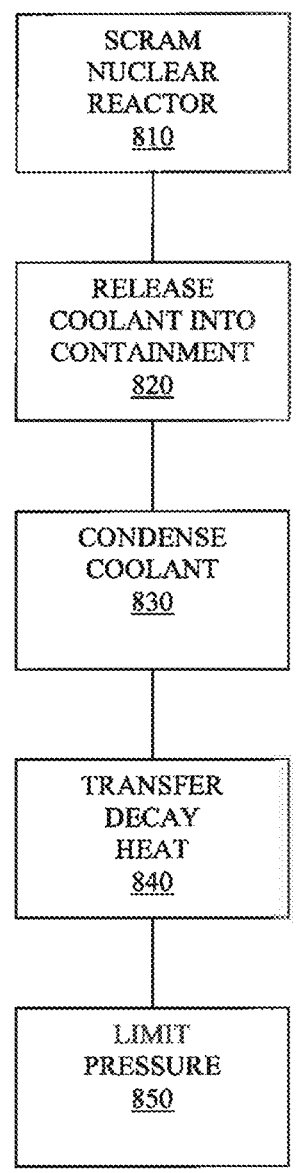
FIG. 8 illustrates a novel method of cooling a power module assembly.

FIG. 8 illustrates a novel method of cooling a power system, such as the power module assembly 50 of FIG. 3. At operation 810, the power module assembly 50 is scrammed in the event of a high pressure event indicated in a reactor vessel, such as the reactor vessel 52 of FIG. 3.

At operation 820, coolant is released into a containment region, such as containment region 44 of FIG. 3, located between a containment vessel, such as containment vessel 54 of FIG. 3 and the reactor vessel 52. The containment region 54 surrounds the reactor vessel 52 and may be substantially dry prior to the high pressure event. The coolant, such as coolant 100, may be released as a vapor 41 or steam into the containment vessel 54. In one embodiment, steam that is released from the secondary coolant system 30 of FIG. 1 as a result of failure or loss of pressure integrity may also be vented into the containment vessel 54.

At operation 830 the vapor 41 condenses on an inner wall, such as inner wall 55 of the containment vessel 54. The vapor 41 may be condensed into a liquid, such as water.

At operation 840, a decay heat is transferred to a liquid medium surrounding the containment vessel 54. The decay heat may be transferred via condensation of the vapor 41, as well as convection and conduction of the condensed liquid.

At operation 850, the pressure in the containment region 44 is limited or maintained within design limits through the condensation of the coolant on the inner wall. A steam flow limiter such as flow limiter 58 of FIG. 3 may be sized to limit a rate of pressure increase in the containment vessel 54. The rate of pressure increase may be substantially offset by the condensation of the vapor 41 into liquid. The steam flow limiter 58 may be selectively or intermittently opened such that a pressure in the containment vessel 54 is limited to a maximum value and allowed to depressurize when the flow limiter 58 is closed.

The condensation of the vapor 41 may reduce pressure within the containment region 44 by approximately to same amount as the released coolant increases pressure in the containment region 44. The coolant 100 may be released into the containment region 44 as vapor 41 or steam, and a decay heat of the reactor core 6 may be removed from the power module assembly 50 by condensing the vapor 41 on the inner wall 55 of the containment vessel 54.

Although the embodiments provided herein have primarily described a pressurized water reactor, it should be apparent to one skilled in the art that the embodiments may be applied to other types of nuclear power systems as described or with some obvious modification. For example, the embodiments or variations thereof may also be made operable with a boiling water reactor. A boiling water reactor may require larger vessels to produce the same energy output.

The rate of release of the coolant into the containment vessel, the rate of condensation of the coolant into a liquid, and the rate of increase of pressure in the containment vessel, as well as other rates and values described herein are provided by way of example only. Other rates and values may be determined through experimentation such as construction of full scale or scaled models of the nuclear reactor.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A power module assembly comprising:
a reactor core;
a reactor vessel housing the reactor core, wherein the reactor core is submerged in primary coolant contained within the reactor vessel;
a containment vessel which substantially surrounds the reactor vessel, wherein the containment vessel is internally dry and forms a containment region which is maintained at a below atmospheric pressure during normal operation of the power module assembly; and
a vent configured to controllably release the primary coolant from the reactor vessel into the containment vessel as primarily steam during an over-pressurization event, wherein the containment vessel is configured to retain all of the released primary coolant within the containment vessel, wherein the containment vessel is at least partially surrounded by a heat sink, and wherein a decay heat of the reactor core is transferred to the heat sink primarily through condensation of the released primary coolant on an inner surface of the containment vessel.

2. The power module assembly of claim 1, wherein the vent comprises a flow limiter connected to the reactor vessel and configured to controllably release the primary coolant at a rate that maintains a steady state containment pressure through the condensation of the primary coolant.

3. The power module assembly of claim 1, further comprising an intake configured to circulate the released primary coolant that condenses in the containment vessel back through the reactor core without the primary coolant leaving the containment vessel.

4. The power module assembly of claim 1, wherein the heat sink is configured to passively remove the decay heat for at least three days without any operator intervention.

5. The power module assembly of claim 1, including cooling fins attached to an outside wall of the containment vessel and in contact with the heat sink to further remove the decay heat of the reactor core.

6. The power module assembly of claim 1, wherein the heat sink comprises water or gas.

7. The power module assembly of claim 1, wherein the heat sink comprises rock, soil, or other solid material.

8. The power module assembly of claim 1, wherein a second containment region formed between the reactor vessel and the containment vessel is maintained at atmospheric pressure, and wherein the steam is released into the second containment region during the over-pressurization event.

9. The power module assembly of claim 8, wherein the reactor vessel is insulated by conventional thermal insulation in the containment region, and wherein the reactor vessel is insulated by reflective insulation in the second containment region.

10. The power module assembly of claim 8, further comprising one or more valves connecting the second containment region to the containment region, and wherein the one or more valves are operatively configured to transfer the condensed primary coolant from the second containment region to the containment region.

11. A power module assembly comprising:
a reactor core;
a reactor vessel housing the reactor core, wherein the reactor core is submerged in primary coolant contained within the reactor vessel;
a containment vessel which substantially surrounds the reactor vessel;
means for controllably releasing the primary coolant as steam into the containment vessel in response to a high pressure condition within the reactor vessel, wherein an inner surface of the containment vessel is dry prior to releasing the primary coolant as steam into the containment vessel, and wherein steam that condenses on the inner surface of the containment vessel forms a pool of primary coolant in the containment vessel; and
means for drawing the pool of primary coolant back into the reactor vessel.

12. The power module assembly of claim 11, wherein the condensation of the steam on the inner surface of the containment vessel reduces pressure in the containment vessel at approximately the same rate that the released steam adds pressure to the containment vessel.

13. The power module assembly of claim 11, wherein the steam is released into the containment vessel to remove a decay heat of the reactor core through the condensation of the steam on the inner surface of the containment vessel, and wherein the decay heat is transferred to a heat sink contacting an outer surface of the containment vessel.

14. The power module assembly of claim 13, wherein heat from the power module is removed primarily through conduction from the outer surface of the containment vessel.

15. The power module assembly of claim 13, wherein the heat sink comprises a pool of water which substantially surrounds the containment vessel and is configured to passively remove the decay heat for at least three days without any operator intervention.

16. The power module assembly of claim 11, wherein the containment vessel is maintained at a below atmospheric pressure prior to controllably releasing the primary coolant as steam, and wherein the containment vessel is maintained at an above atmospheric pressure condition after the primary coolant is released into the containment vessel.

17. The power module assembly of claim 16, wherein an outer surface of the reactor vessel comprises a steel housing, and wherein the steel housing is exposed directly to the below atmospheric pressure during normal operation of the power module.

18. The power module assembly of claim 11, wherein a first containment region formed between the containment vessel and the reactor vessel is maintained at atmospheric pressure, and wherein a second containment region formed between the containment vessel and the reactor vessel is maintained at a below atmospheric pressure prior to the over-pressurization event.

19. The power module assembly of claim 18, wherein the reactor vessel is insulated by conventional thermal insulation in the first containment region, and wherein the reactor vessel is insulated by reflective insulation in the second containment region.

20. The power module assembly of claim 11, wherein the pool of primary coolant extends between an outer wall of the reactor vessel and the inner surface of the containment vessel.

\* \* \* \* \*